US007288866B2

(12) United States Patent
Kuribayashi et al.

(10) Patent No.: US 7,288,866 B2
(45) Date of Patent: Oct. 30, 2007

(54) ROTARY ELECTRIC MACHINE

(75) Inventors: Masaru Kuribayashi, Tokyo (JP);
Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 234 days.

(21) Appl. No.: 10/879,728

(22) Filed: Jun. 30, 2004

(65) Prior Publication Data
US 2005/0001494 A1    Jan. 6, 2005

(30) Foreign Application Priority Data
Jul. 1, 2003    (JP) .............................. 2003-189708

(51) Int. Cl.
H02K 11/00    (2006.01)
(52) U.S. Cl. ...................................... 310/71
(58) Field of Classification Search .................. 310/71, 310/89; 439/709
See application file for complete search history.

(56) References Cited
U.S. PATENT DOCUMENTS

| | | | | | |
|---|---|---|---|---|---|
| 2,487,328 | A | * | 11/1949 | Wallace et al. | 310/83 |
| 2,507,242 | A | * | 5/1950 | Bost | 439/49 |
| 2,531,719 | A | * | 11/1950 | Alvino | 318/296 |
| 2,781,463 | A | * | 2/1957 | Sprando | 310/71 |
| 3,976,965 | A | * | 8/1976 | Remus | 310/71 |
| 4,345,806 | A | * | 8/1982 | McHenney | 439/510 |
| 4,683,390 | A | | 7/1987 | Imori et al. | |
| 4,712,029 | A | * | 12/1987 | Nold | 310/71 |
| 4,843,267 | A | | 6/1989 | Kaneyuki et al. | |
| 4,851,725 | A | | 7/1989 | Keck et al. | |
| 5,296,770 | A | * | 3/1994 | Pflueger et al. | 310/14 |
| 5,592,038 | A | * | 1/1997 | Gaspar et al. | 310/71 |
| 5,821,674 | A | * | 10/1998 | Weiner | 310/68 D |
| 6,048,219 | A | * | 4/2000 | Kotowski | 310/71 |
| 6,882,070 | B2 | * | 4/2005 | Staigl et al. | 310/71 |
| 2001/0054853 | A1 | | 12/2001 | Hayashi et al. | |
| 2002/0043883 | A1 | | 4/2002 | Shimizu | |
| 2002/0050752 | A1 | * | 5/2002 | Katsuzawa et al. | 310/71 |
| 2005/0001494 | A1 | * | 1/2005 | Kuribayashi et al. | 310/71 |

FOREIGN PATENT DOCUMENTS

| | | | |
|---|---|---|---|
| FR | 2 618 272 | A | 1/1989 |
| GB | 953 366 | A | 3/1964 |
| JP | 60096147 | A * | 5/1985 |
| JP | 61-171454 | | 10/1986 |
| JP | 05-022892 | A | 1/1993 |
| JP | 5-161295 | A | 6/1993 |
| JP | 7-163148 | A | 6/1993 |
| JP | 6-335212 | A | 12/1994 |
| JP | 2002-78283 | | 3/2002 |
| JP | 2002-204549 | A | 7/2002 |

* cited by examiner

*Primary Examiner*—Dang Le
*Assistant Examiner*—Nguyen Hanh
(74) *Attorney, Agent, or Firm*—Sughrue Mion Pllc.

(57) ABSTRACT

An output terminal mount includes a molded resin body in which a harness connecting portion and a mounting portion are formed integrally; internal terminals insert molded into the molded resin body such that connecting terminals at a first end are exposed inside harness slots and three-phase output wires are each connected at a second end; and three-phase output bolts insert molded into the molded resin body so as to project into each of the harness slots, nuts being fastened to the projecting portions such that the connecting terminals and terminals of a three-phase output wiring harness are placed in pressure contact with each other. The output terminal mount is mounted by fixing the mount portion to an end surface of a rear bracket at a position between an outer periphery of a crown portion and a radially outer peripheral surface of the rear bracket.

10 Claims, 10 Drawing Sheets

ROTARY ELECTRIC MACHINE

BACKGROUND OF THE INVENTION

1. Field of the Invention

The present invention relates to a rotary electric machine mounted to an electric vehicle or a hybrid vehicle, etc., and particularly to a configurative relationship between an output terminal mount to which a three-phase output wiring harness is connected and a housing.

2. Description of the Related Art

In conventional rotary electric machines, a rectifier apparatus is disposed inside a housing. A connecting seat is disposed so as to extend from a joining portion at one end of a heat sink on an output side of the rectifier apparatus. In addition, one end of an output terminal bolt is securely fastened to the connecting seat, and the output terminal bolt is passed through the housing and led radially outward so that an external power source cable can be connected. (See Patent Literature 1, for example.)

Patent Literature 1: Japanese Patent Laid-Open No. HEI 5-22892 (Gazette: FIG. 1)

In conventional rotary electric machines, the output terminal bolt is fixed to the connecting seat of the heat sink of the rectifier apparatus and projects radially outside the housing, and the external power source cable is securely fastened to the portion of the output terminal bolt projecting out through the housing. Thus, there has been a strong possibility that damage may be caused to a coupled portion of the output terminal bolt, where the output terminal bolt and the connecting seat are coupled, due to pivoting of the external power source cable around the coupled portion as a result of vibrations.

With enlargements in diameter and increases in weight in external power source cables accompanying increases in output from rotary electric machines, increases are increasingly being sought in the strength of output extracting portions. Furthermore, in conventional rotary electric machines, since the rectifier apparatus is housed internally, only one output terminal bolt has been required, but in rotary electric machines in which the rectifier apparatus is not housed internally, three output terminal bolts are required, leading to further increases being sought in the strength of the output extracting portions.

In recent years, rotary electric machines are increasingly being equipped with rotor position detecting devices. In rotary electric machines of this kind, a hollow cylindrical crown portion is disposed so as to protrude centrally from an axial end surface of a housing, and the rotor position detecting device is disposed inside the crown portion. Thus, the crown portion accommodating the rotor position detecting device places constraints on the layout of the output extracting portions.

SUMMARY OF THE INVENTION

The present invention aims to solve the above problems and an object of the present invention is to provide a rotary electric machine including an output terminal mount for externally extracting output from an armature winding, and a rotor position detecting device, wherein a mounting construction of the output terminal mount enables the output terminal mount to be mounted to a housing firmly while avoiding a crown portion accommodating the rotor position detecting device.

With the above object in view, the rotary electric machine of the present invention includes a housing on which a crown portion is disposed so as to protrude centrally from an axial end surface; a rotor rotatably disposed inside the housing; an armature having an armature coil, the armature being fixed to the housing so as to surround the rotor; and an output terminal mount for connecting three-phase output wires of the armature coil and a three-phase output wiring harness. The output terminal mount further includes a molded resin body in which a harness connecting portion and a mounting portion are formed integrally, the harness connecting portion having a plurality of harness slots that are separated from each other. The output terminal mount still further includes internal terminals integrated with the molded resin body such that connecting terminals at a first end are exposed inside each of the harness slots and the three-phase output wires are each connected at a second end. The output terminal mount yet further includes three-phase output bolts integrated with the molded resin body so as to project into each of the harness slots, nuts being fastened to the projecting portions such that the connecting terminals and terminals of the three-phase output wiring harness are placed in pressure contact with each other. Further, the output terminal mount is mounted by fixing the mount portion to the axial end surface of the housing at a position between an outer periphery of the crown portion and a radially outer peripheral surface of the housing.

Therefore, the output terminal mount can be mounted to the housing firmly while avoiding the crown portion of the housing.

DETAILED DESCRIPTION OF THE PREFERRED EMBODIMENTS

Preferred embodiments of the present invention will now be explained with reference to the drawings.

Embodiment 1

Figure 1:
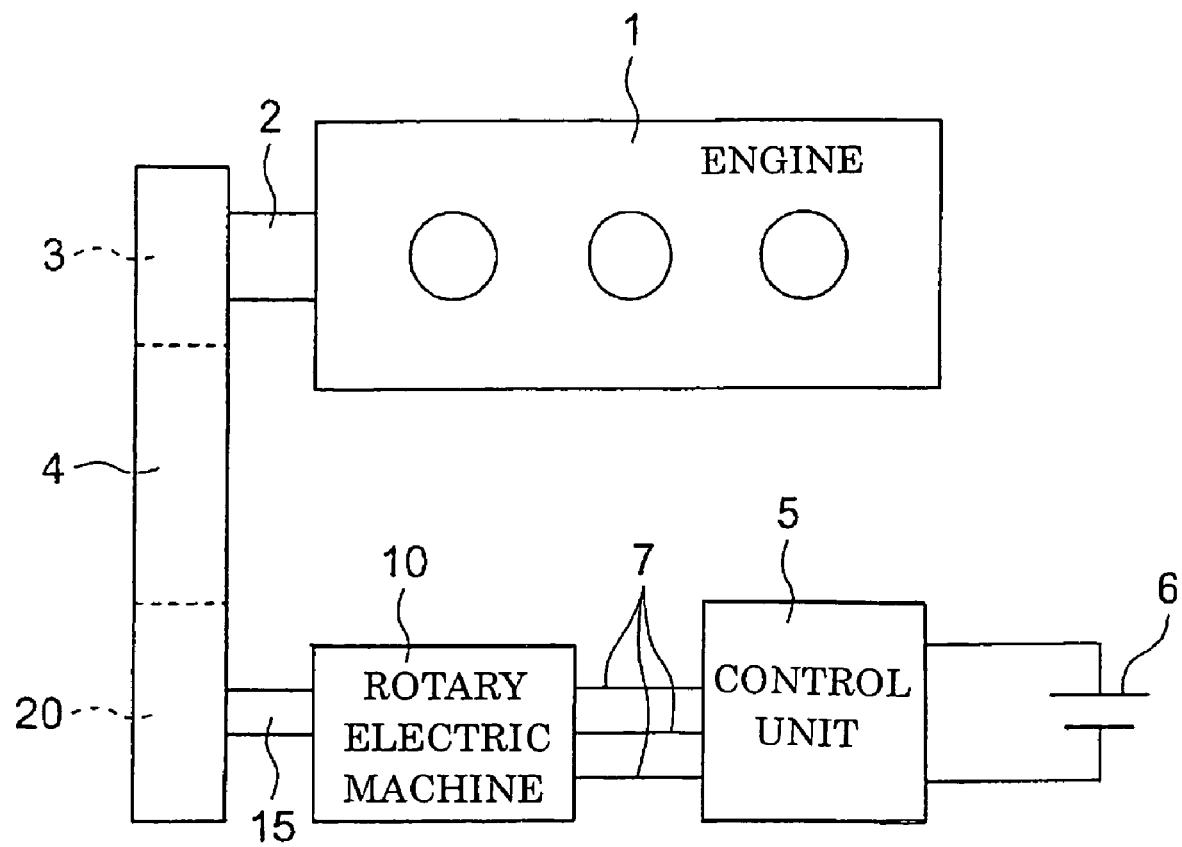
FIG. 1 is a system configuration diagram for an automotive vehicle mounted with a rotary electric machine according to Embodiment 1 of the present invention.

FIG. 1 is a system configuration diagram for an automotive vehicle mounted with a rotary electric machine according to Embodiment 1 of the present invention.

In FIG. 1, a rotary electric machine 10 is a generator-motor functioning as a generator and as an electric motor, a belt 4 being placed between a rotary electric machine pulley 20 and a crank shaft pulley 3 to perform bisectional transmission of driving forces to and from an engine 1. The rotary electric machine 10 is connected to a control unit 5 by means of a three-phase output wiring harness 7.

Operation of the rotary electric machine 10 will now explained.

First, during electric motor operation, direct-current power from a power source 6 is converted to appropriate alternating-current power by the control unit 5 and supplied to the rotary electric machine 10. The rotary electric machine 10 is rotated by this electric power, generating a driving force. This driving force is transmitted to the crank shaft 2 by means of the belt 4, starting the engine 1.

During electric power generation, on the other hand, a portion of a driving force from the engine 1 is transmitted to the rotary electric machine 10 by means of the belt 4, generating an alternating-current output. This alternating-current output is supplied to the control unit 5 by means of the three-phase output wiring harness 7, is converted to appropriate direct-current power, and is supplied to a vehicle load (not shown) and the power source 6.

Figure 2:
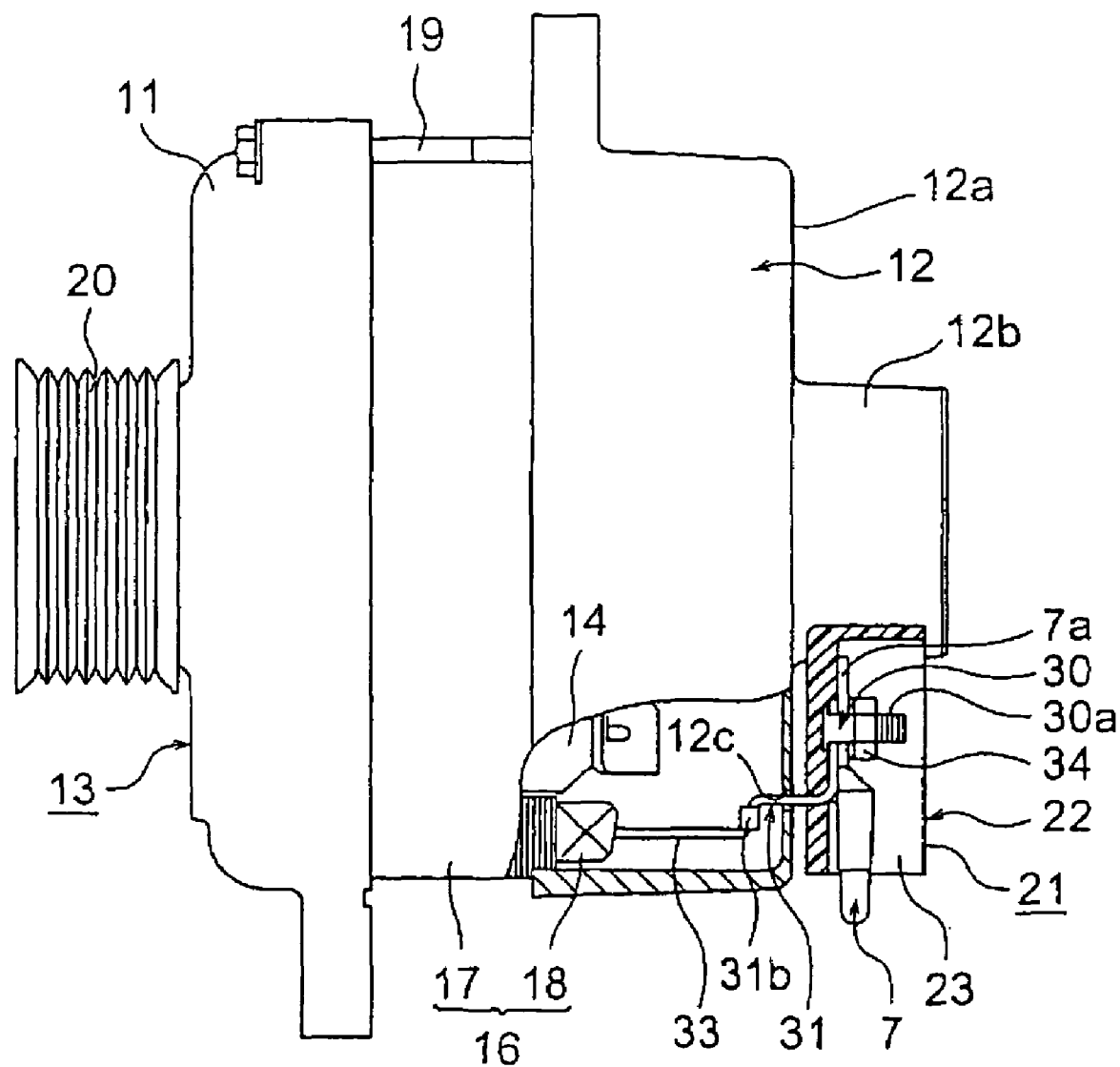
FIG. 2 is a partially cut away side elevation showing the rotary electric machine according to Embodiment 1 of the present invention.
Figure 3:
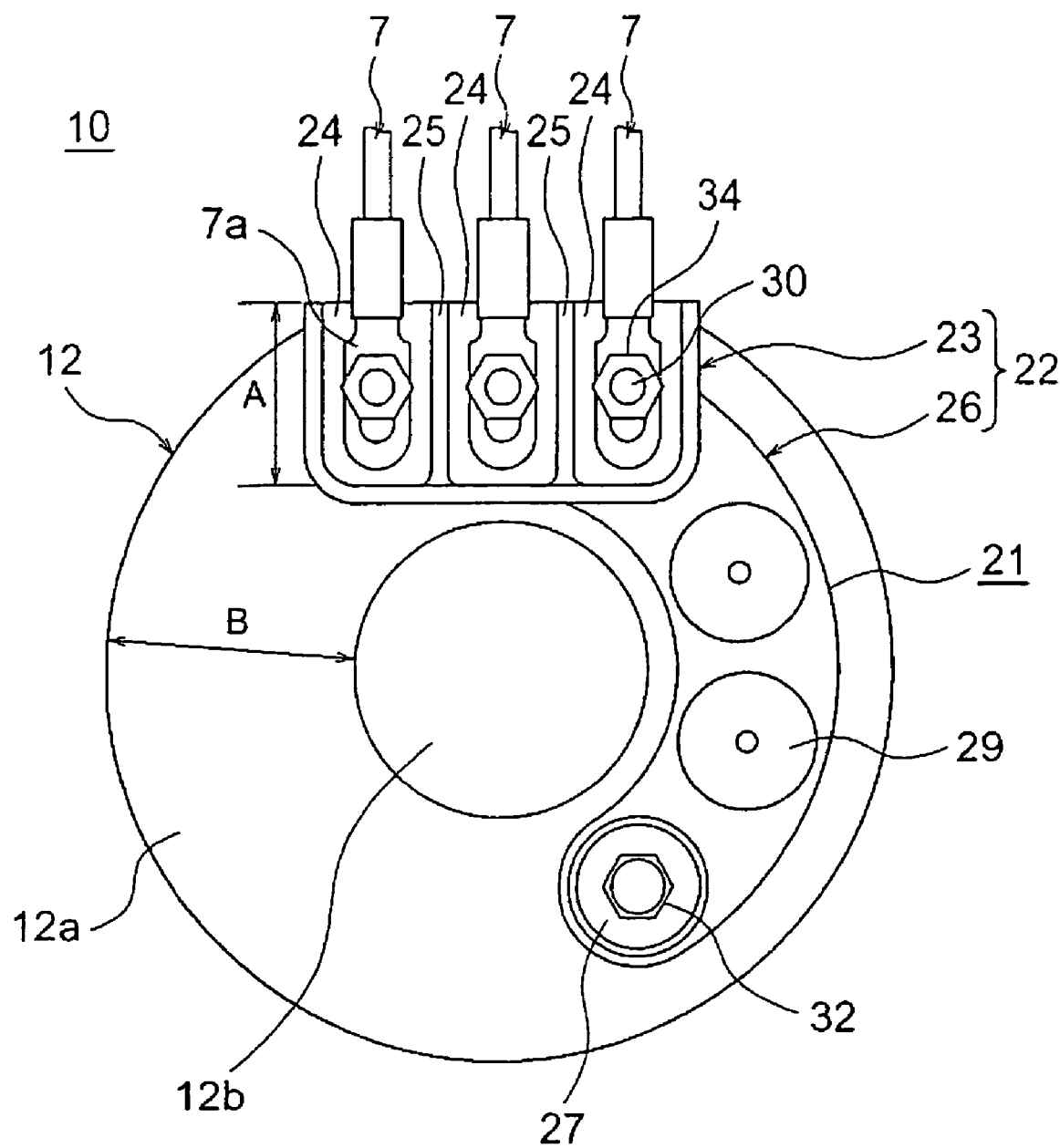
FIG. 3 is a rear elevation of the rotary electric machine according to Embodiment 1 of the present invention.
Figure 4:
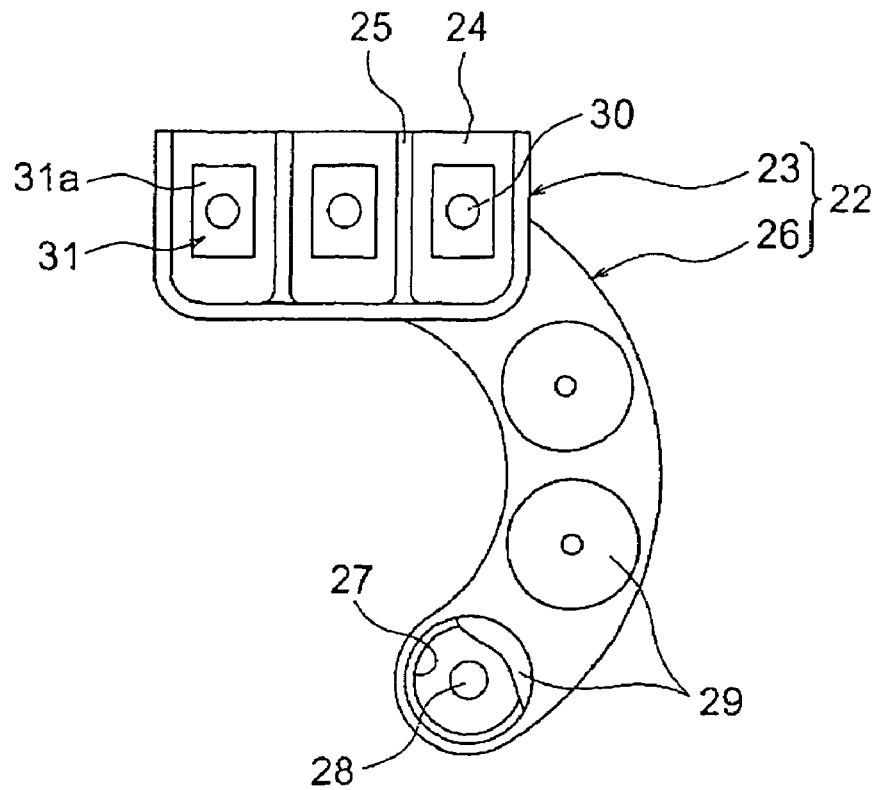
FIG. 4 is a rear elevation showing an output terminal mount used in the rotary electric machine according to Embodiment 1 of the present invention.
Figure 5:
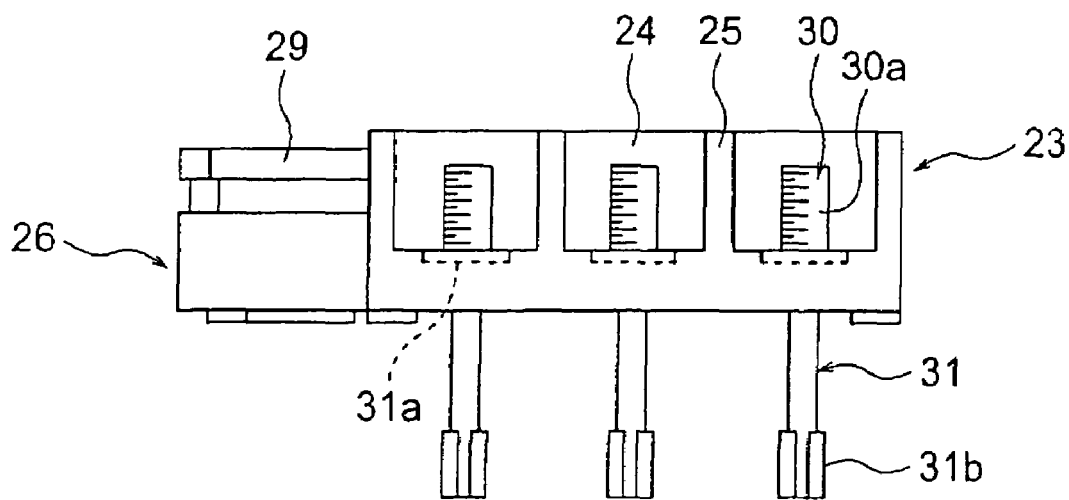
FIG. 5 is a side elevation showing the output terminal mount used in the rotary electric machine according to Embodiment 1 of the present invention.
Figure 6:
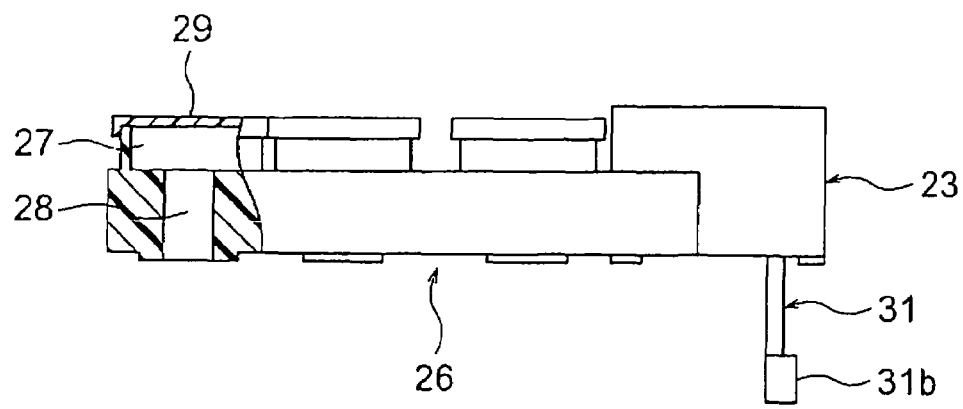
FIG. 6 is a partially cut away side elevation showing the output terminal mount used in the rotary electric machine according to Embodiment 1 of the present invention.

Next, a configuration of the rotary electric machine will be explained with reference to FIGS. 2 to 6. Here, FIG. 2 is a partially cut away side elevation showing the rotary electric machine according to Embodiment 1 of the present invention, FIG. 3 is a rear elevation of the rotary electric machine according to Embodiment 1 of the present invention, and FIGS. 4 to 6 are a rear elevation, a side elevation, and a partially cut away side elevation, respectively, showing an output terminal mount used in the rotary electric machine according to Embodiment 1 of the present invention.

In FIGS. 2 to 6, the rotary electric machine 10 is provided with: a rotor 14 supported by a shaft 15 and rotatably disposed inside a housing 13 composed of a front bracket 11 and a rear bracket 12; and an armature 16 disposed such that radial edge portions at first and second axial ends of an armature core 17 are held between the front bracket 11 and the rear bracket 12 so as to surround the rotor 14. The front bracket 11 and the rear bracket 12 are fastened together by a through bolt 19.

The rotary electric machine pulley 20 is fixed to an end of the shaft 15 of the rotor projecting outward through the front bracket 11. A crown portion 12b having a floored cylindrical shape is disposed so as to protrude centrally from an end surface 12a of the rear bracket 12 such that an open end thereof faces an interior portion of the rear bracket 12. A rotor position detecting device (not shown) composed of Hall elements, resolvers, etc., for example, for detecting positions of magnetic poles of the rotor 14 is disposed inside the crown portion 12b. In addition, an output terminal mount 21 is mounted to the end surface 12a of the rear bracket 12 on an outer periphery of the crown portion 12b. This end surface 12a of the rear bracket 12 is formed into a flat surface and constitutes a mounting surface for the output terminal mount 21. Moreover, it is not necessary for the entire surface of the end surface 12a to be formed into a flat surface, provided that at least a portion where the output terminal mount 21 is to be mounted (a mounting surface) is formed into a flat surface.

The output terminal mount 21 has a molded resin body 22 made of a polyphenylene sulfide (PPS) resin, for example, in which a harness connecting portion 23 and a mounting portion 26 are formed integrally. The harness connecting portion 23 is constructed such that three harness slots 24 separated by partitions 25 disposed at a uniform pitch are arranged in a single row. Here, slot longitudinal directions of the harness slots 24 are parallel to each other. The pitch between the partitions 25 is slightly larger than a width of terminals 7a of the three-phase output wiring harness 7.

On the other hand, the mounting portion 26 forms a flat arc shape disposed so as to extend in an arc shape from the harness connecting portion 23, and three mounting recess portions 27 are formed thereon so as to be separated from each other in a circumferential direction. A mounting aperture 28 is disposed through each of the mounting recess portions 27 so as to be covered by caps 29.

Three three-phase output bolts 30 are insert molded into the molded resin body 22 such that each projects inside a harness slot 24. Screw threaded portions 30a are formed on portions of the three-phase output bolts 30 projecting inside the harness slots 24.

Three internal terminals 31 are insert molded into the molded resin body 22 such that a first end of each is exposed inside a harness slot 24, and a second end projects outward. Portions of the internal terminals 31 exposed inside the harness slots 24 constitute connecting terminals 31a. Crimped portions 31b are formed on projecting ends of the internal terminals 31.

The output terminal mount 21 constructed in this manner is mounted by passing mounting bolts 32 through the mounting apertures 28 and fastening them to the end surface 12a of the rear bracket 12 (the mounting surface). At this time, the mounting portion 26 is disposed concentrically on an outer periphery of the crown portion 12b, and an axial height of the harness connecting portion 23 and the mounting portion 26 is lower than the crown portion 12b. Furthermore, only edge portions of the harness connecting portion 23 at first and second ends in a direction of arrangement of the harness slots project radially outside an outer peripheral edge portion of the end surface 12a of the rear bracket 12.

The second end portion of each of the internal terminals 31 is led inside the rear bracket 12 through lead-in apertures 12c of the rear bracket 12. End portions of the three-phase output wires 33 of the armature coil 18 are electrically connected to each of the internal terminals 31. At this time, the end portions of the three-phase output wires 33 are inserted into the crimp portions 31b, and electrical connection of the two is performed by crimping the crimp portions 31b.

The terminals 7a of the three-phase output wiring harness 7 are inserted into each of the harness slots 24, and nuts 34 are fastened onto the screw threaded portions 30a of the three-phase output bolts 30. Thus, the terminals 7a are placed in pressure contact with the connecting terminals 31a of the internal terminals 31 by the fastening force of the nuts 34, performing electrical connection of the two.

In this manner, the control unit 5 and the rotary electric machine 10 are electrically connected by means of the three-phase output wiring harness 7 and the output terminal mount 21.

According to Embodiment 1, the mounting portion 26 of the output terminal mount 21 is securely fastened to the end surface 12a of the rear bracket 12 by the mounting bolts 32, and the three-phase output wiring harness 7 is secured to the connecting terminals 31a of the output terminal mount 21 by fastening between the screw threaded portions 30a of the three-phase output bolts 30 and the nuts 34. Thus, strength in the mounting of the output terminal mount 21 to the rear bracket 12 is increased. In addition, because the mounting portion 26 and the harness connecting portion 23 of the output terminal mount 21 are placed in contact with the end surface 12a, pivoting of the output terminal mount 21 resulting from vibration in the three-phase output wiring harness 7 is suppressed, suppressing the occurrence of damage to the output terminal mount 21.

Because the mounting portion 26 of the output terminal mount 21 is formed into an arc shape having a larger diameter than that of the crown portion 12b, the output terminal mount 21 can be mounted to the end surface 12a easily while avoiding the crown portion 12b.

Because the pitch between the partition walls 25 is formed slightly larger than the width of the terminals 7a, the terminals 7a are prevented from pivoting around the three-phase output bolts 30 when the terminals 7a are inserted into the harness slots 24 and the nuts 34 are fastened to the screw threaded portions 30a of the three-phase output bolts 30. Thus, the terminals 7a are prevented from being turned during the operation of fastening the nuts 34, improving workability during the fastening operation.

Because the amount of protrusion of the output terminal mount 21 radially outside the outer peripheral edge portion of the end surface 12a of the rear bracket 12 is suppressed, and the output terminal mount 21 does not project axially outward from the crown portion 12b of the rear bracket 12, mount ability of the rotary electric machine 10 is improved, and increases in the weight of the rotary electric machine 10 are suppressed.

Now, the terminals 7a of the three-phase output wiring harness 7 and the connecting terminals 31a of the internal terminals 31 are electrically connected by being place in pressure contact with each other by fastening the nuts 34 onto the screw threaded portions 30a of the three-phase output bolts 30. Thus, it is necessary to make a slot length A of the harness slots 24 long enough to ensure mechanical strength and pressure welding surface area in the connecting portions between the three-phase output wiring harness 7 and the internal terminals 31.

If the internal terminals 31 are insert molded, it is necessary to form a layer of resin having a predetermined thickness between an end portion of the molded resin body and the end portions of the connecting terminals 31a due to constraints of molding in a metal mold. Thus, if a predetermined length cannot be ensured in the slot length A of the harness slots 24, the surface area of the connecting terminals 31a will be reduced.

In a generator-motor functioning as a generator and as an electric motor, if M6 bolts are used for the three-phase output bolts 30, it is necessary to make the slot length A of the harness slots 24 greater than or equal to 20 mm to ensure sufficient pressure welding surface area between the three-phase output wiring harness 7 and the internal terminals 31. Furthermore, from the viewpoint of mount ability of the rotary electric machine, it is desirable for the output terminal mount 21 not to project significantly outside the outer peripheral edge portion of the end surface 12a of the rear bracket 12. In Embodiment 1, a center of the end portion of the harness connecting portion 23 in the direction of arrangement of the harness slots is aligned with an outer peripheral edge portion of the end surface 12a of the rear bracket 12.

From these points, it is desirable for a radial length B of the end surface 12a of the rear bracket 12 to which the output terminal mount 21 is mounted (a length from an outer peripheral edge portion of the crown portion 12b to the outer peripheral edge portion of the end surface 12a) to be set to greater than or equal to 25 mm.

Specifically, if the radial length B of the end surface 12a is less than 25 mm, and an attempt is made to make room for the slot length A of the harness slots 24, the amount of protrusion of the output terminal mount 21 radially outside the end surface 12a is increased, reducing the mount ability of the rotary electric machine. Furthermore, if the radial length B of the end surface 12a is less than 25 mm, and an attempt is made to reduce protrusion of the output terminal mount 21 radially outside the end surface 12a, the slot length A of the harness slots 24 will be reduced, preventing sufficient pressure welding surface area between the three-phase output wiring harness 7 and the internal terminals 31 from being ensured, thereby increasing electric loss at the connecting portions. Thus, if the radial length B of the end surface 12a is made at least 25 mm, protrusion of the output terminal mount 21 radially outward from the end surface 12a is suppressed while enabling sufficient pressure welding surface area between the three-phase output wiring harness 7 and the internal terminals 31 to be ensured.

Moreover, a maximum value for the radial length B of the end surface 12a is determined by an outside diameter specification of the rotary electric machine. Furthermore, the crown portion 12b is formed into a cylindrical shape, but the external shape of the crown portion is not limited to a cylindrical shape, and may also be formed into an angular shape such as a quadrilateral, etc.

Embodiment 2

Figure 7:
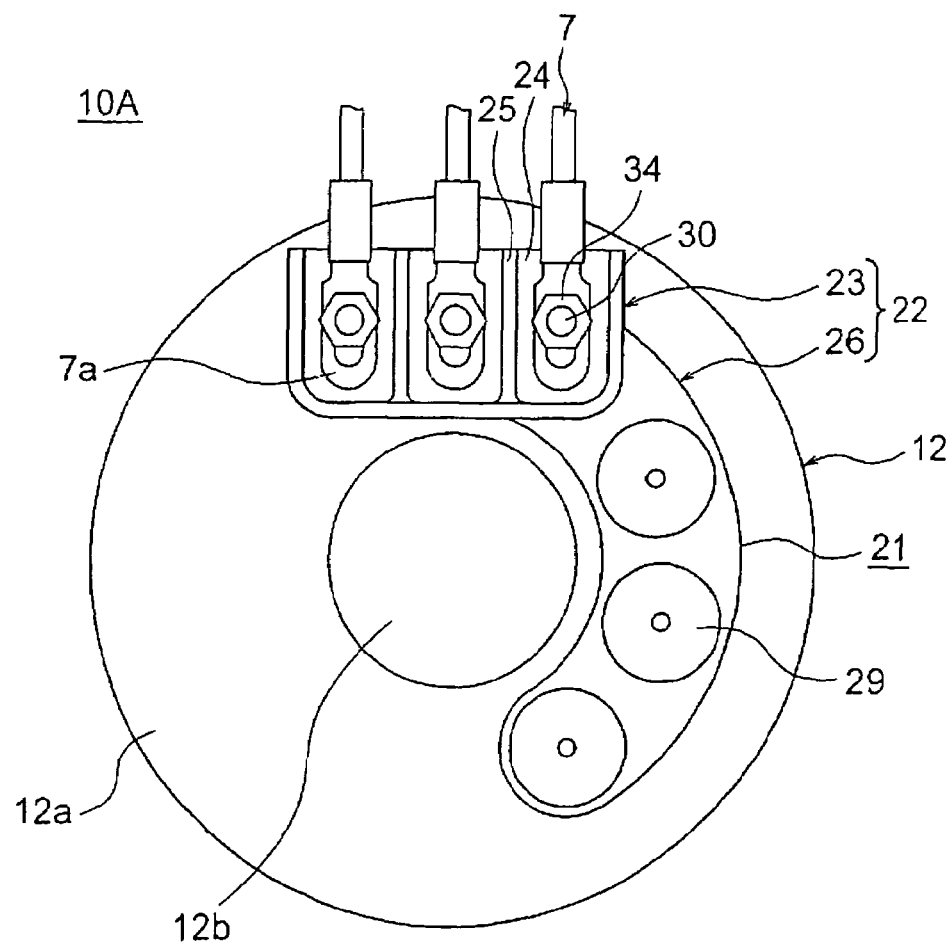
FIG. 7 is a rear elevation of a rotary electric machine according to Embodiment 2 of the present invention.

FIG. 7 is a rear elevation of a rotary electric machine according to Embodiment 2 of the present invention.

In FIG. 7, an output terminal mount 21 is positioned radially inside an outer peripheral edge portion of an end surface 12a of a rear bracket 12.

Moreover, the rest of this embodiment is constructed in a similar manner to Embodiment 1 above.

In a rotary electric machine 10A according to Embodiment 2, because the output terminal mount 21 does not project radially outside the outer peripheral edge portion of the end surface 12a of the rear bracket 12, the rotary electric machine 10A is compact, improving mount ability.

Embodiment 3

Figure 8:
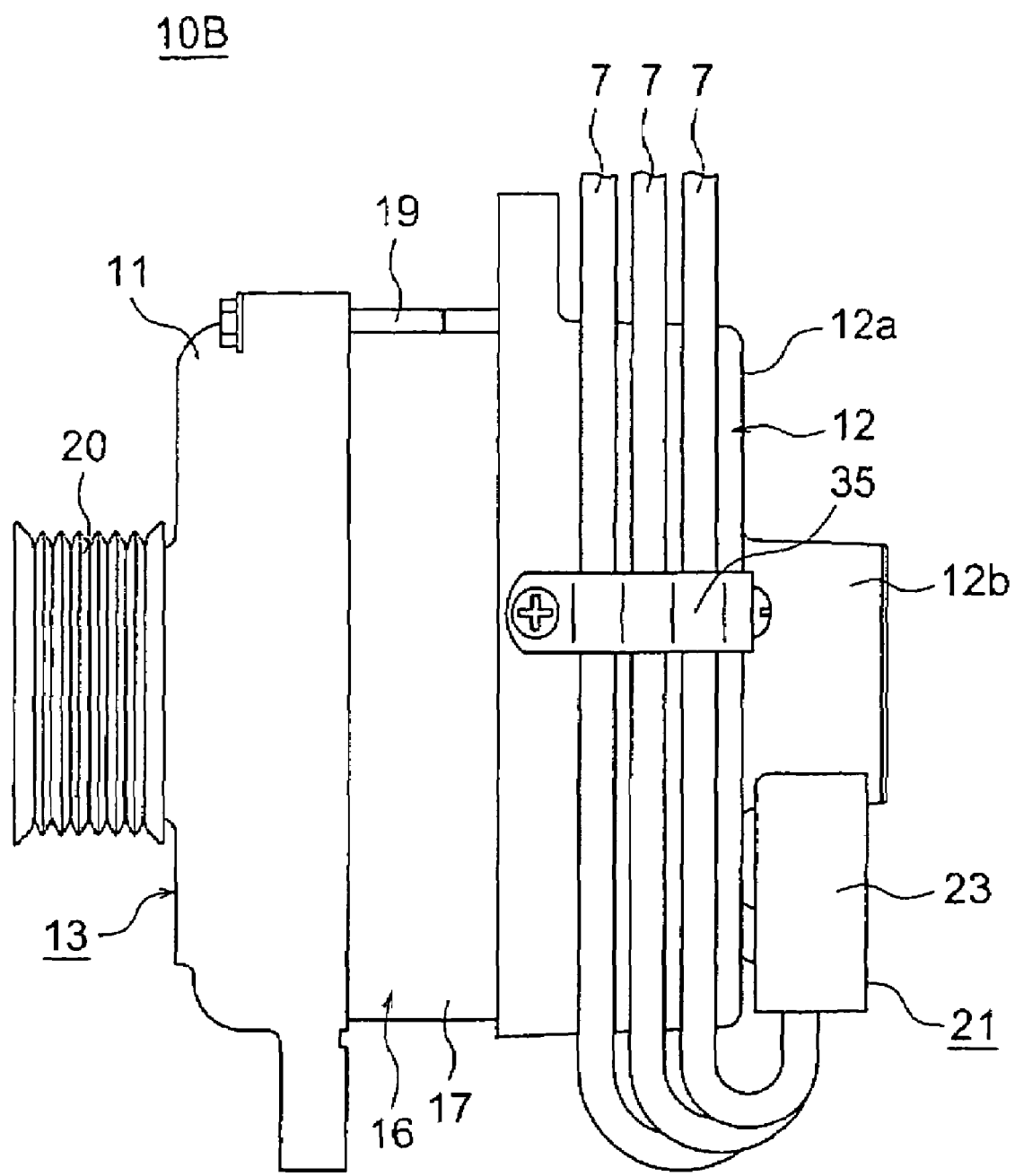
FIG. 8 is a side elevation showing a rotary electric machine according to Embodiment 3 of the present invention.

FIG. 8 is a side elevation showing a rotary electric machine according to Embodiment 3 of the present invention.

In FIG. 8, three wires of a three-phase output wiring harness 7 are secured to a rear bracket 12 so as to project outward from a harness connecting portion 23, then made to follow a radially outer peripheral surface of the rear bracket 12, and all three are gathered together by a retainer 35.

Moreover, the rest of this embodiment is constructed in a similar manner to Embodiment 1 above.

In a rotary electric machine 10B according to Embodiment 3, because the three wires of the three-phase output wiring harness 7 are secured to the rear bracket 12, the three-phase output wiring harness 7 vibrates in phase with the rotary electric machine 10B. Thus, forces applied to the output terminal mount 21 as a result of vibration in the three-phase output wiring harness 7 are reduced, suppressing the occurrence of damage to the output terminal mount 21, and also suppressing the occurrence of damage to the coupling portions of the terminals 7a by the nuts 34.

Embodiment 4

Figure 9:
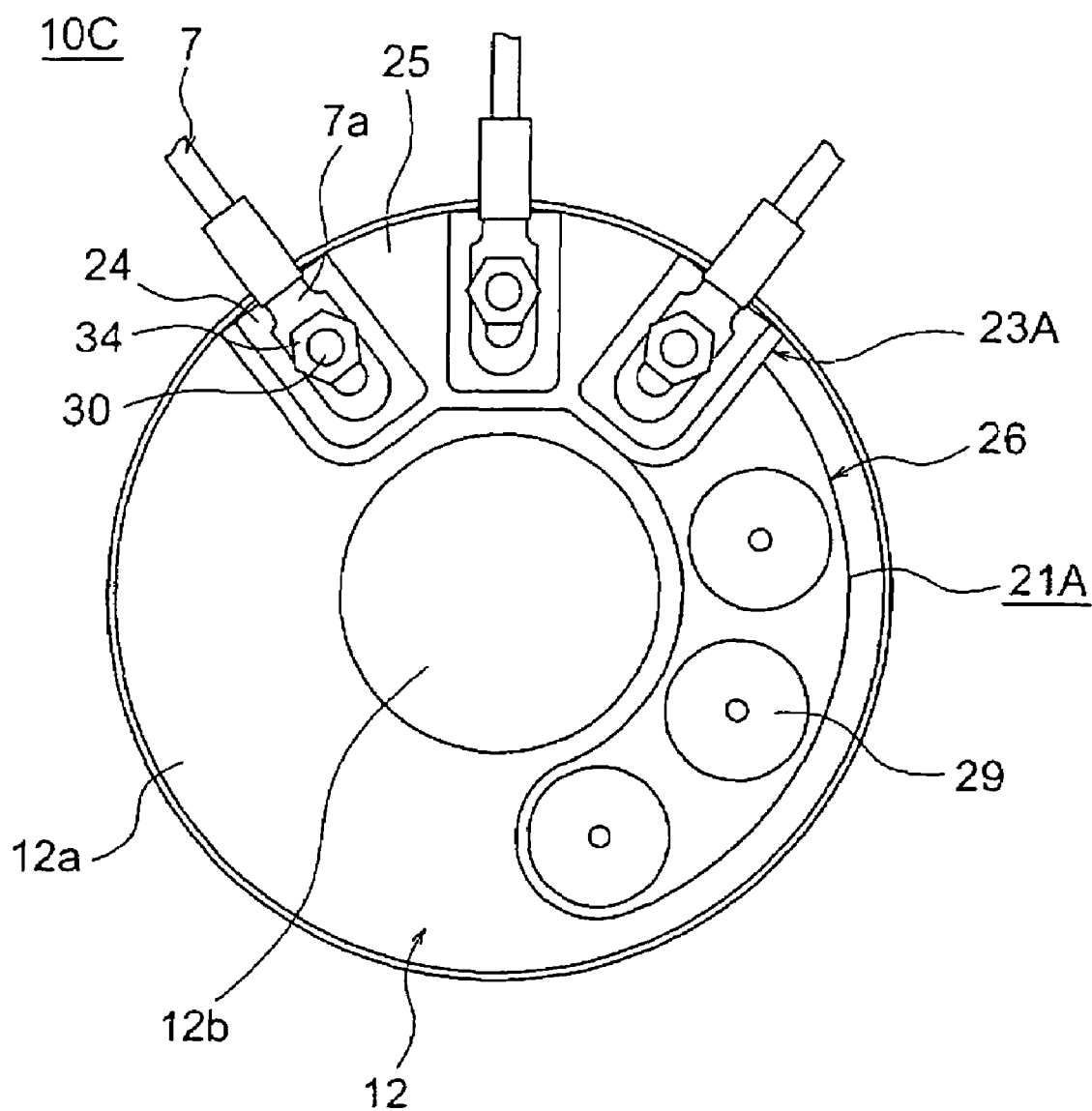
FIG. 9 is a rear elevation of a rotary electric machine according to Embodiment 4 of the present invention.

FIG. 9 is a rear elevation of a rotary electric machine according to Embodiment 4 of the present invention.

In FIG. 9, a harness connecting portion 23A is constructed such that three harness slots 24 are arranged into a radial pattern with slot longitudinal directions aligned in radial directions. Thus, the three harness slots 24 are formed at an even angular pitch in a circumferential direction, and the three-phase output bolts 30 are disposed on a concentric circle centered around a central axis of a rear bracket 12. The harness connecting portion 23A is positioned radially inside an outer peripheral edge portion of an end surface 12a of the rear bracket 12.

Moreover, the rest of this embodiment is constructed in a similar manner to Embodiment 1 above.

In a rotary electric machine 10C according to Embodiment 4, because an output terminal mount 21A does not project radially outside the outer peripheral edge portion of the end surface 12a of the rear bracket 12, the rotary electric machine 10C is compact, improving mount ability.

Now, in Embodiment 2 above, the output terminal mount 21 is positioned radially inside the outer peripheral edge portion of the end surface 12a of the rear bracket 12 by reducing the slot length A of the three harness slots 24. Thus, if the outside diameter of the rear bracket 12 is reduced, a predetermined length (such as 20 mm, for example) cannot be ensured in the slot length A of the harness slots 24. As a result, sufficient pressure welding surface area between the connecting terminals 31a and the terminals 7a cannot be ensured in Embodiment 2 above if the outside diameter of the rear bracket 12 is small.

According to Embodiment 4, because the harness slots 24 of the harness connecting portion 23A of the output terminal mount 21A are arranged in a radial pattern, the output terminal mount 21A can be formed such that the slot lengths A of the harness slots 24 at first and second circumferential ends are not reduced and the harness connecting portion 23A does not project radially outside the outer peripheral edge portion of the end surface 12a of the rear bracket 12 even if the outside diameter of the rear bracket 12 is reduced. Thus, because the slot lengths A of the three harness slots 24 can be made equal and a required length can be ensured, the surface area of the connecting terminals 31a of the internal terminals 31 exposed inside the three harness slots 24 can be made equal without any reduction. In this manner, sufficient pressure welding surface area between the connecting terminals 31a and the terminals 7a can be ensured and made uniform in the three harness slots 24 without increasing electric loss in the three connecting portions between the three-phase output wiring harness 7 and the internal terminals 31.

Embodiment 5

Figure 10:
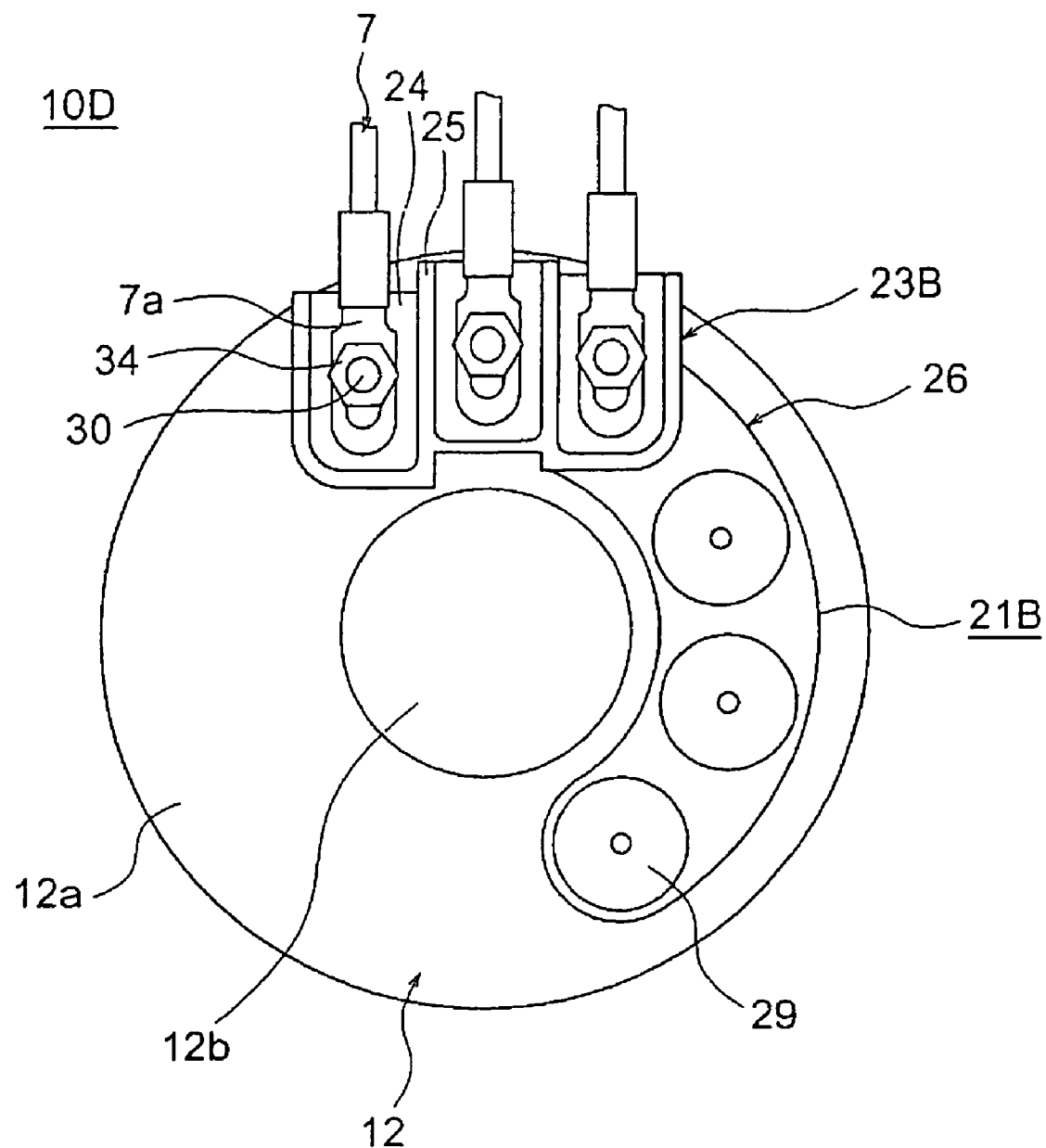
FIG. 10 is a rear elevation of a rotary electric machine according to Embodiment 5 of the present invention.

FIG. 10 is a rear elevation of a rotary electric machine according to Embodiment 5 of the present invention.

In FIG. 10, a harness connecting portion 23B is constructed such that three harness slots 24 separated by partitions 25 disposed at a uniform pitch are arranged in a single row. The harness connecting portion 23B (output terminal mount 21B) is positioned radially inside an outer peripheral edge portion of an end surface 12a of a rear bracket 12 by offsetting the harness slots 24 at first and second circumferential ends radially inward by a predetermined amount. Three-phase output bolts 30 are disposed on a concentric circle centered around a central axis of a rear bracket 12.

Moreover, the rest of this embodiment is constructed in a similar manner to Embodiment 1 above.

In a rotary electric machine 10D according to Embodiment 5, because the output terminal mount 21B does not project radially outside the outer peripheral edge portion of the end surface 12a of the rear bracket 12, the rotary electric machine 10D is also compact, improving mount ability.

Because the harness slots 24 at the first and second circumferential ends are offset radially inward by a predetermined amount, the output terminal mount 21B can be formed such that the slot lengths A of the harness slots 24 at first and second circumferential ends are not reduced and the harness connecting portion 23B does not project radially outside the outer peripheral edge portion of the end surface 12a of the rear bracket 12 even if the outside diameter of the rear bracket 12 is reduced. Consequently, in Embodiment 5, the three connecting portions between the connecting terminals 31a and the terminals 7a can also be made uniform without increasing electric loss, in a similar manner to Embodiment 4 above.

Embodiment 6

Figure 11:
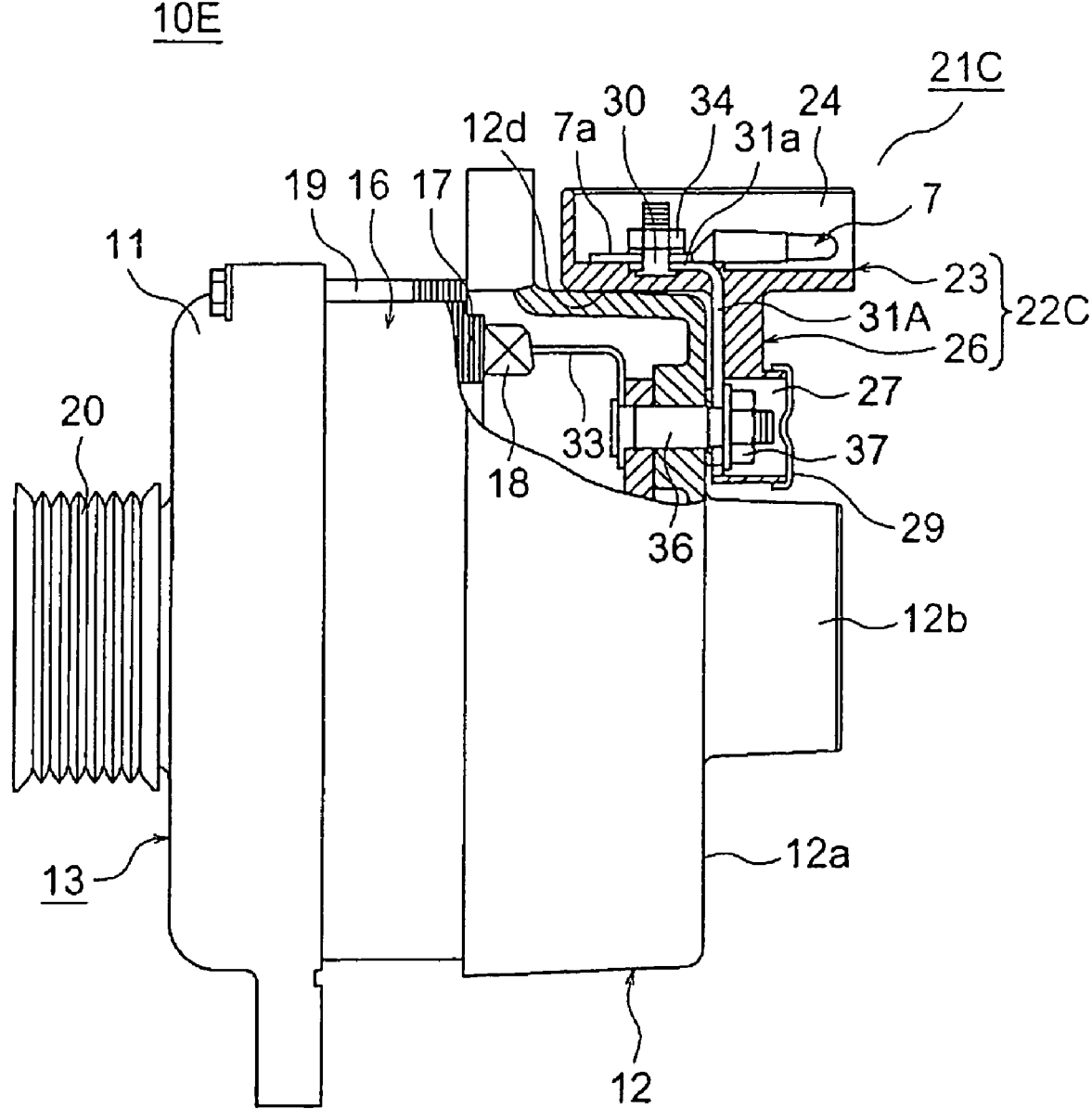
FIG. 11 is a partially cut away side elevation showing a rotary electric machine according to Embodiment 6 of the present invention.

FIG. 11 is a partially cut away side elevation showing a rotary electric machine according to Embodiment 6 of the present invention.

In FIG. 11, a molded resin body 22C of an output terminal mount 21C is constructed so as to link a harness connecting portion 23 and an arc-shaped mounting portion 26 so as to be generally perpendicular to each other. Internal terminals 31A are insert molded such that a first end is exposed inside a harness slot 24, and a second end projects inside a mounting recess portion 27. Portions of the internal terminals 31A exposed inside the harness slots 24 constitute connecting terminals 31a.

Moreover, the rest of this embodiment is constructed in a similar manner to Embodiment 1 above.

In a rotary electric machine 10E according to Embodiment 6, the output terminal mount 21C is disposed such that the mounting portion 26 is positioned concentrically on an outer periphery of the crown portion 12b and placed in close contact with the end surface 12a, and a portion of the harness connecting portion 23 forming an L shape with the mounting portion 26 is placed in close contact with a radially outer peripheral surface 12d of the rear bracket 12. Then, the output terminal mount 21C is mounted to the rear bracket 12 by passing mounting bolts 36 through mounting apertures 28 from inside the rear bracket 12, and fastening nuts 37 onto the mounting bolts 36. Here, the second ends of the internal terminals 31A are electrically connected to the mounting bolts 36 by being fastened by the nuts 37. Slot longitudinal directions of the harness slots 24 are aligned in the axial direction of the rotary electric machine 10E.

The mounting bolts 36 are in an electrically-insulated state relative to the rear bracket 12, and three-phase output wires 33 are electrically connected to the mounting bolts 36. Thus, the three-phase output wires 33 and the internal terminal 31A are electrically connected by means of the mounting bolts 36.

The terminals 7a of the three-phase output wiring harness 7 are inserted into the harness slots 24 from axially outside, the nuts 34 are fastened onto the screw threaded portions 30a of the three-phase output bolts 30, and the terminals 7a are electrically connected to the connecting terminals 31a by being placed in pressure contact. Thus, the three-phase output wiring harness 7 projects in a direction away from the armature core 17.

According to Embodiment 6, because the output terminal mount 21C is constructed so as to link a harness connecting portion 23 and an arc-shaped mounting portion 26 so as to be generally perpendicular to each other, and is mounted so as to contact the end surface 12a and the radially outer peripheral surface 12d of the rear bracket 12, strength in the mounting of the output terminal mount 21C can be increased.

Because the mounting portion 26 and the harness connecting portion 23 linked so as to be generally perpendicular are placed in contact with the end surface 12a and the radially outer peripheral surface 12d of the rear bracket 12, respectively, pivoting of the output terminal mount 21C resulting from vibration in the three-phase output wiring harness 7 is suppressed, suppressing the occurrence of damage to the output terminal mount 21C.

Because the three-phase output wiring harness 7 projects outward from the harness connecting portion 23 in a direction away from the armature 16, the influence of heat generated by the armature 16 on the three-phase output wiring harness 7 can be reduced.

Embodiment 7

Figure 12:
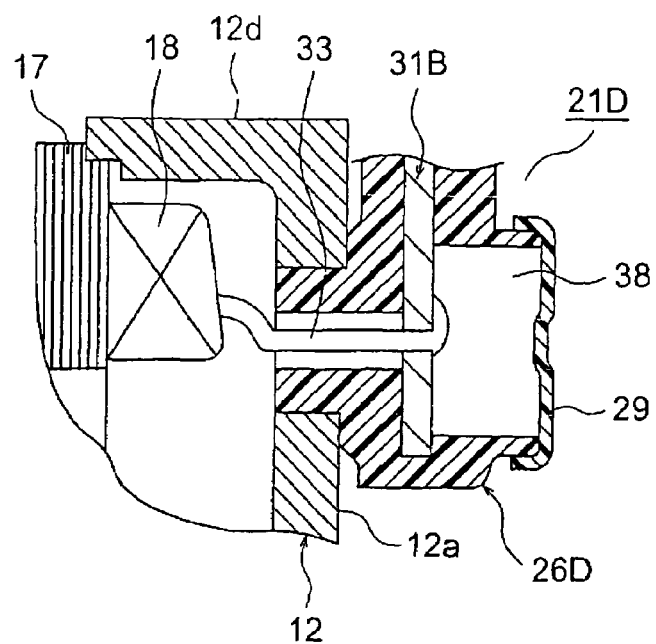
FIG. 12 is a cross section showing part of a rotary electric machine according to Embodiment 7 of the present invention.

FIG. 12 is a cross section showing part of a rotary electric machine according to Embodiment 7 of the present invention.

In FIG. 12, an output terminal mount 21D is constructed so as to link a harness connecting portion 23 and an arc-shaped mounting portion 26D so as to be generally perpendicular to each other in a similar manner to Embodiment 6 above. A connecting recess portion 38 is disposed on the mounting portion 26D in addition to the mounting recess portion 27, and internal terminals 31B are insert molded such that a first end is exposed inside a harness slot 24, and a second end projects inside the connecting recess portion 38. Portions of the internal terminals 31B exposed inside the harness slots 24 constitute connecting terminals 31a.

Moreover, the rest of this embodiment is constructed in a similar manner to Embodiment 6 above.

In a rotary electric machine 10F according to Embodiment 7, the output terminal mount 21D is disposed such that the mounting portion 26D is positioned concentrically on the outer periphery of the crown portion 12b and placed in close contact with the end surface 12a, and the harness connecting portion 23 is placed in close contact with the radially outer peripheral surface 12d of the rear bracket 12. The output terminal mount 21D is mounted by passing mounting bolts 32 (not shown) through the mounting apertures 28 and fastening them to the end surface 12a of the rear bracket 12.

The three-phase output wires 33 of the armature coil 18 are led out into the connecting recess portion 38, and welded to exposed portions of the internal terminals 31B.

According to Embodiment 7, because the three-phase output wires 33 are welded to the internal terminal 31B, electric loss in the connecting portions can be reduced compared to connecting methods employing fastening with bolts or threads, or crimping.

Because the three three-phase output wires 33 led out through the rear bracket 12 and the three internal terminals 31B of the output terminal mount 21D are connected directly without interposing other parts, generation of heat at the connecting portions can be suppressed.

Moreover, in Embodiment 7 above, the three-phase output wires 33 and the internal terminal 31B are connected directly by welding, but they may also be connected directly by brazing.

Furthermore, in Embodiment 7 above, the three-phase output wires and the internal terminals are explained as being connected directly in the rotary electric machine according to Embodiment 6 above, but similar effects are also exhibited when applied to the rotary electric machines of other embodiments.

Embodiment 8

Figure 13:
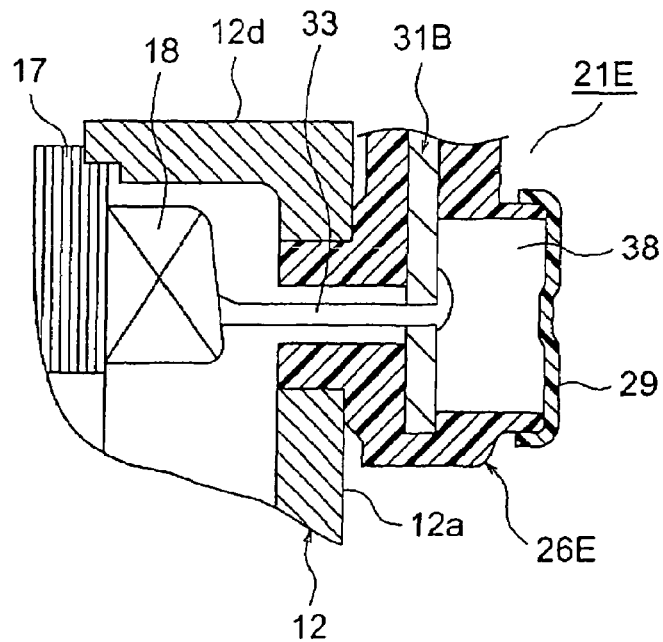
FIG. 13 is a cross section showing part of a rotary electric machine according to Embodiment 8 of the present invention.

FIG. 13 is a cross section showing part of a rotary electric machine according to Embodiment 8 of the present invention.

In FIG. 13, an output terminal mount 21E is constructed so as to link a harness connecting portion 23 and an arc-shaped mounting portion 26E so as to be generally perpendicular to each other in a similar manner to Embodiment 7 above. A connecting recess portion 38 is disposed on the mounting portion 26E in addition to the mounting recess portion 27, and internal terminals 31B are insert molded such that a first end is exposed inside a harness slot 24, and a second end projects inside the connecting recess portion 38. Portions of the internal terminals 31B exposed inside the harness slots 24 constitute connecting terminals 31a. The connecting recess portion 38 is formed so as to be aligned axially with positions at which the three-phase output wires 33 are led out from the armature coil 18 when the output terminal mount 21E is mounted to the rear bracket 12.

Moreover, the rest of this embodiment is constructed in a similar manner to Embodiment 7 above.

In a rotary electric machine 10G according to Embodiment 8, the output terminal mount 21E is disposed such that the mounting portion 26E is positioned concentrically on the outer periphery of the crown portion 12b and placed in close contact with the end surface 12a, and the harness connecting portion 23 is placed in close contact with the radially outer peripheral surface 12d of the rear bracket 12. The output terminal mount 21E is mounted by passing mounting bolts 32 (not shown) through the mounting apertures 28 and fastening them to the end surface 12a of the rear bracket 12.

The three-phase output wires 33 are led out axially from the armature coil 18, led out into the connecting recess portion 38 while maintaining their radial positions and circumferential positions, and welded to exposed portions of the internal terminals 31B.

Consequently, in Embodiment 8, because the three-phase output wires 33 are led out axially from the armature coil 18, led out into the connecting recess portion 38 while maintaining their radial positions and circumferential positions, and welded to exposed portions of the internal terminals 31B, damage to an electrically-insulating coating coated on the three-phase output wires 33 resulting from flexing of the three-phase output wires 33 is eliminated, improving electrical insulation, and troublesome lead-around work for the three-phase output wires 33 is eliminated, simplifying the operation of connecting the three-phase output wires 33.

Moreover, each of the above embodiments has been explained with reference to an output terminal mount having three harness slots 24, but the number of harness slots 24 is not limited to three, and may vary depending on the construction of the rotary electric machine. For example, if the armature coil 18 is constituted by a single three-phase alternating-current winding, and the neutral point thereof is output, four harness slots are required.

What is claimed is:

1. A rotary electric machine comprising:
    a housing on which a crown portion is disposed so as to protrude centrally from an axial end surface;
    a rotor rotatably disposed inside said housing;
    an armature having an armature coil, said armature being fixed to said housing so as to surround said rotor; and
    an output terminal mount for connecting three-phase output wires of said armature coil and a three-phase output wiring harness,
    wherein said output terminal mount further comprises:
    a molded resin body in which a harness connecting portion and a mounting portion are formed integrally, said harness connecting portion having a plurality of harness slots that are separated from each other;
    internal terminals integrated with said molded resin body such that connecting terminals at a first end are exposed inside each of said harness slots and said three-phase output wires are each connected at a second end; and
    three-phase output bolts integrated with said molded resin body so as to project into each of said harness slots, nuts being fastened to said projecting portions such that said connecting terminals and terminals of said three-phase output wiring harness are placed in pressure contact with each other,
    said output terminal mount being mounted by fixing said mount portion to said axial end surface of said housing at a position between an outer periphery of said crown portion and a radially outer peripheral surface of said housing.

2. The rotary electric machine according to claim 1, wherein said three-phase output wires are led out through said housing and connected directly to said internal terminals.

3. The rotary electric machine according to claim 2, wherein said three-phase output wires are led out from said armature coil, extend in an axial direction while maintaining radial and circumferential positions, pass through said housing, and are connected to said internal terminals.

4. The rotary electric machine according to claim 1, wherein said three-phase output bolts are arranged in a row on a concentric circle centered around a central axis of said housing.

5. The rotary electric machine according to claim 4, wherein said harness slots are constructed such that slot longitudinal directions form a radial pattern relative to said central axis of said housing.

6. The rotary electric machine according to claim 4, wherein said harness slots are constructed such that slot longitudinal directions are parallel to each other.

7. The rotary electric machine according to claim 1, wherein said output terminal mount is positioned radially inside said radially outer peripheral surface of said housing.

8. The rotary electric machine according to claim 1, wherein said output terminal mount is shaped such that said harness connecting portion and said mount portion are substantially perpendicular to each other, said output terminal mount being mounted to said housing by placing said harness connecting portion alongside said radially outer peripheral surface of said housing and placing said mount portion alongside said axial end surface of said housing.

9. The rotary electric machine according to claim 1, wherein said output terminal mount is positioned axially inside an axial end surface of said crown portion.

10. The rotary electric machine according to claim 1, wherein said three-phase output wiring harness is tied to an outer peripheral surface of said housing.

* * * * *